Figure 1:
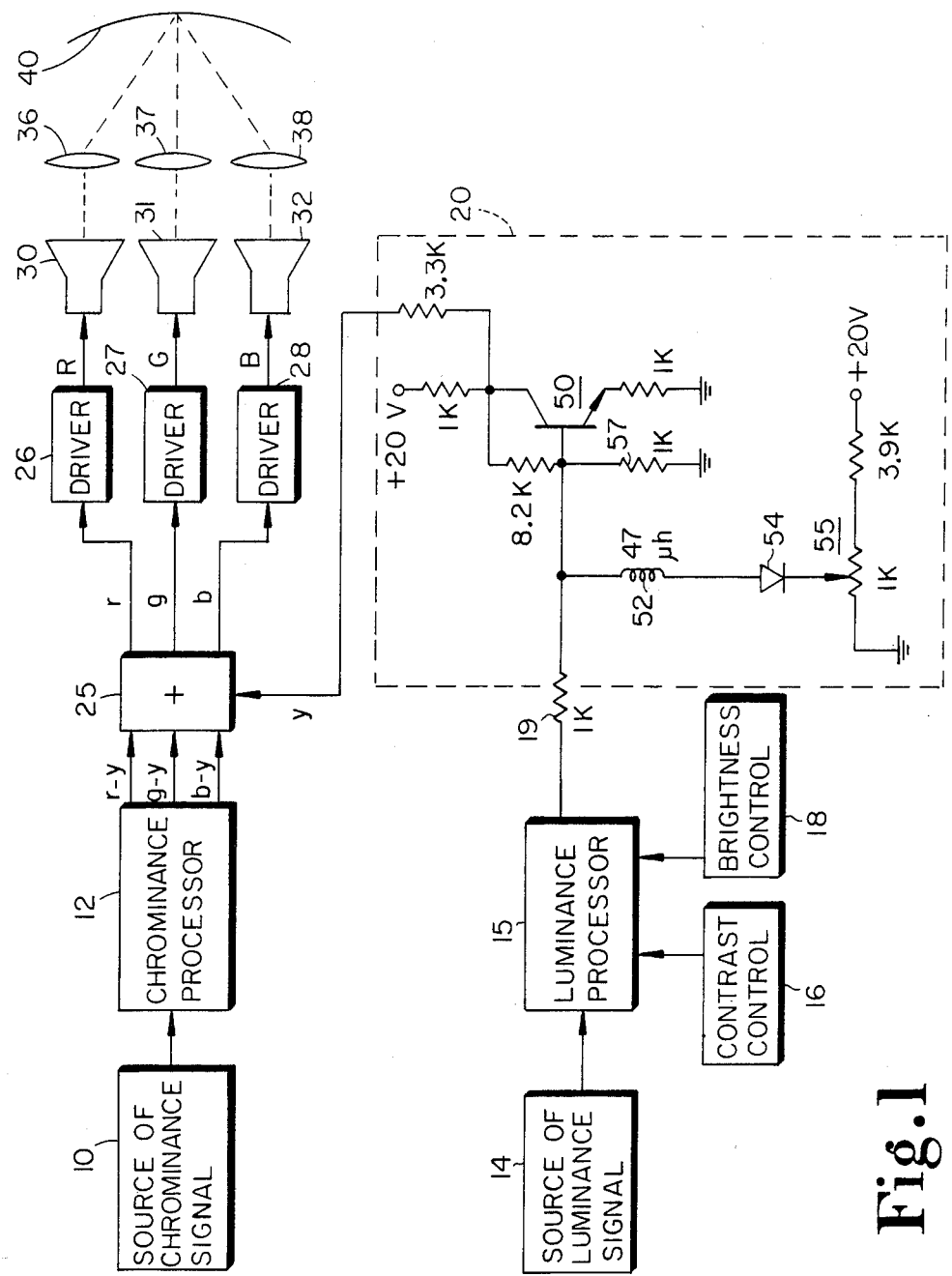

United States Patent [19]

Reeder

[11] Patent Number: 4,573,081

[45] Date of Patent: Feb. 25, 1986

[54] FREQUENCY SELECTIVE VIDEO SIGNAL COMPRESSION

[75] Inventor: Jereld R. Reeder, Indianapolis, Ind.

[73] Assignee: RCA Corporation, Princeton, N.J.

[21] Appl. No.: 526,624

[22] Filed: Aug. 26, 1983

[51] Int. Cl.[4] .......................... H04N 5/74; H04N 5/14
[52] U.S. Cl. .................................... 358/231; 358/166; 358/162; 358/243
[58] Field of Search ............... 358/166, 162, 237, 231, 358/60, 243, 242, 74

[56] References Cited

U.S. PATENT DOCUMENTS

| | | | |
|---|---|---|---|
| 3,009,989 | 11/1961 | Ahrons et al. | |
| 3,017,453 | 1/1962 | Raibourn | 358/166 X |
| 3,983,576 | 9/1976 | Shanley et al. | 358/38 |
| 4,038,688 | 7/1977 | Chow et al. | 358/174 |
| 4,075,661 | 2/1978 | Heffron | 358/166 |
| 4,296,435 | 10/1981 | d'Hautecourt et al. | 358/166 |
| 4,365,266 | 12/1982 | Lagoni | 358/37 |
| 4,502,076 | 2/1985 | Cluniat et al. | 358/160 |

FOREIGN PATENT DOCUMENTS 1600043  3/1978  United Kingdom .

OTHER PUBLICATIONS

Service Data Bulletin for RCA Projection Television System Model PGR 200/300, (1982 PTV-3).

Primary Examiner—Michael A. Masinick
Assistant Examiner—E. Anne Toth
Attorney, Agent, or Firm—P. J. Rasmussen; P. M. Emanuel; R. H. Kurdyla

[57] ABSTRACT

A projection-type television system includes apparatus for providing frequency selective compression of video signals. Low frequency video signal components representative of white image information above a threshold level are subjected to relatively greater compression compared to high frequency video signal components representative of white image information.

10 Claims, 2 Drawing Figures

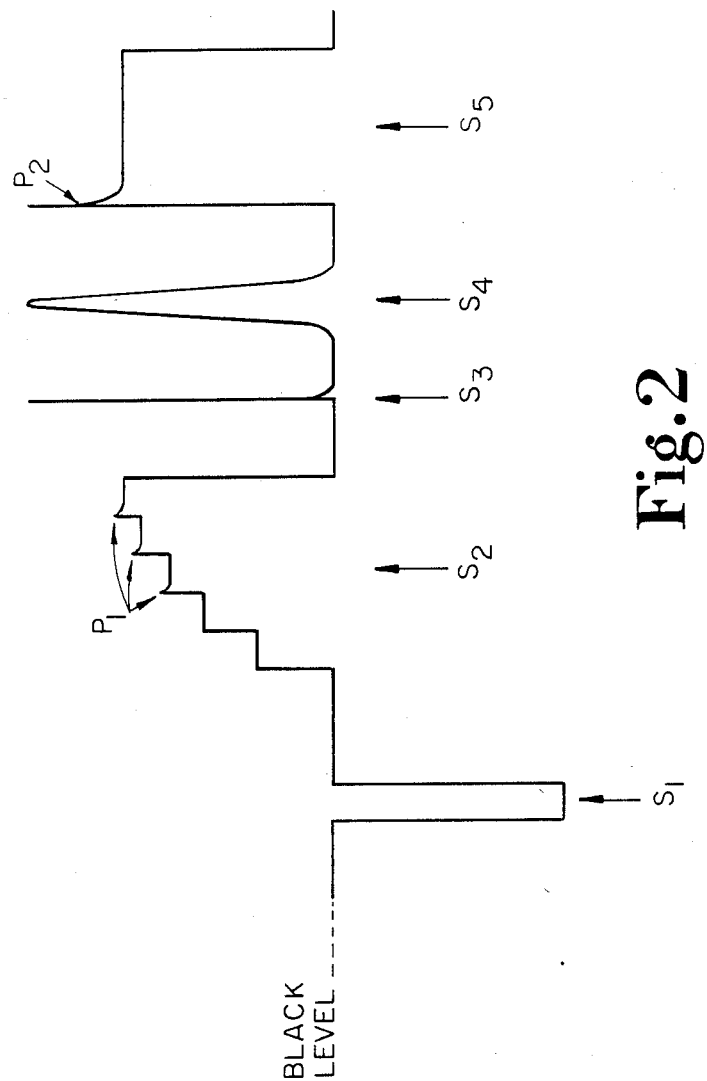

FREQUENCY SELECTIVE VIDEO SIGNAL COMPRESSION

This invention concerns apparatus for compressing a video signal in a manner which produces a more pleasing picture display such as in a television system of the projected image type.

Color television systems of the projection type are well known. Typically, in such systems, three primary color images are separately projected onto a viewing screen via three image reproducing cathode ray tubes and an optical lens system which operates as an image magnifier. Such systems can be of the front-projection type, or the rear-projection type which has one or more "folds" in the light path between the cathode ray tubes and the viewing screen. Various aspects of projection television systems are discussed in an article by K. Schiecke entitled "Projection Television: Correcting Distortions" appearing on pages 40-45 of the November, 1981 issue of the IEEE Spectrum.

In such systems the size of the viewing screen and the size of the projected image are significantly greater than the size of an image viewed directly from the screen of a cathode ray tube of a conventional television receiver. However, the increased size of the image in a projection system in usually accompanied by a decrease in the brightness of the projected image. The brightness of the projected image can be increased by using a high speed optical lens system, and by using viewing screens with high gain.

In addition, to increase the brightness of a projected image the phosphors of cathode ray tubes of a projection system are often driven to higher current density levels in response to video signals at or near peak white image levels, compared to the cathode ray tube of a conventional "direct view" television receiver. For example, a projection television cathode ray tube with a 5 inch diagonal screen can exhibit a current density 25 to 30 times greater than that of a direct view cathode ray tube with a 25 inch diagonal screen. Moreover, in a direct view system the amount of power reaching the cathode ray tube is restricted to about 20% of its beam power capability due to the shadow mask associated with the direct view cathode ray tube. However, operating the cathode ray tubes of a projection television system in this manner increases the likelihood that blooming and defocussing of a projected image will result, particularly in response to video signals at or near peak white image levels. Such operation of the cathode ray tubes in a projection television system can also cause changes in the phosphor characteristics of the cathode ray tubes which result in reduced color fidelity, as well as temperature effects which can alter the characteristics of the cathode ray tube such that the quality of a reproduced image is impaired.

In accordance with the principles of the present invention it is herein recognized that a more pleasing displayed image can be produced, particularly in a projection television system, by reducing the magnitude of low frequency video signal components at or near peak white level relative to the magnitude of detail representative high frequency components of the video signal at or near peak white level. Such operation reduces the likelihood of picture blooming and improves the detail of displayed white level images. In addition, it has been found that a slight reduction in overall image brightness which results from such operation is overshadowed by the perceived increase in white image detail particularly for images at or near peak white level.

Accordingly, apparatus disclosed herein pursuant to the present invention comprises a frequency selective video signal translating stage which provides compression of low frequency video signal amplitude components which exceed a threshold level in a white-going direction. Image detail representative high frequency components of the video signal are subjected to relatively less compression than low frequency components of the video signal.

In the drawing:

FIG. 1 shows a portion of a projection television system including a video signal translating circuit in accordance with the principles of the present invention; and FIG. 2 depicts a signal waveform helpful in understanding the operation of the signal translating circuit shown in FIG. 1.

In FIG. 1, the separated chrominance signal component of a composite color television signal is provided from a source 10 to a chrominance signal processor 12 which develops color difference signals r-y, g-y and b-y in a known manner. The separated luminance signal component of the composite television signal is provided from a source 14 to a conventional luminance processor 15 comprising luminance signal amplifying, gain control and DC restoration (black level clamping) stages. Operatively associated with luminance processor 15 are a contrast control network 16 and a brightness control network 18 for respectively controlling the peak-to-peak amplitude and the DC level of luminance signals processed by network 15. Networks 16 and 18 each comprises a viewer adjustable potentiometer. Brightness control 18 is located after the DC restoration stage in luminance processor 15. DC restored output luminance signals supplied from processor 15 (e.g., via an emitter follower output stage) are coupled via a resistor 19 to a video signal translating network 20 which exhibits a frequency selective signal compressing characteristic (rather than a signal "clipping" or "slicing" characteristic) as will be discussed.

Luminance signals (Y) from network 20 are combined in a matrix amplifier 25 with the color difference signals from processor 12 to produce low level color image representative signals r,g,b. These signals are amplified by respective driver amplifiers 26,27,28 to produce high level color signals R,G,B suitable for application to intensity control electrodes (e.g., cathode electrodes) of respective red, green and blue image reproducing cathode ray tubes 30,31 and 32, which can be of the 6ABP series type commercially available from the Rauland Division of Zenith Radio Corporation of Chicago, Ill. Red, green and blue image components from the screens of tubes 30,31 and 32 are projected onto a viewing screen 40 via respective image magnifying optical lenses 36,37 and 38 to form a composite projected color image on viewing screen 40. Video signals are preferably DC coupled between the input of network 20 and the cathode ray tubes.

Network 20 comprises a transistor 50 arranged as a signal inverting common emitter amplifier with a base input for receiving luminance signals and a collector output for providing translated luminance signals to matrix 25. The base input circuit of transistor 50 includes the series combination of an inductor 52 and a diode 54 coupled between the base electrode of transistor 50 and a reference potential provided in accordance with the setting of a pre-set potentiometer 55. A bias voltage provided to diode 54 in accordance with the setting of potentiometer 55 establishes the threshold conduction level of diode 54.

The operation of network 20 will be described with reference to the signal waveform shown in FIG. 2. This signal waveform comprises signal components $S_1$-$S_5$ representative of types of signal components which may be associated with the luminance signal. Specifically, component $S_1$ corresponds to a negative-going blacker-than-black horizontal synchronizing pulse components such as occurs during horizontal image blanking intervals of the video signal. Component $S_2$-$S_5$ correspond to positive, white-going image representative components such as can occur during horizontal image intervals. Components $S_2$, a "staircase" waveform comprising multiple step components containing primarily low frequency image information, corresponds to image information shaded in steps from black to white. Impulse component $S_3$ and pulse component $S_4$ provide relatively high frequency white image detail information comprising signal frequencies in the 2-4 MHz range, and rectangular component $S_5$ provides predominantly low frequency white image information. The brightness of an image projected in response to the signal waveform of FIG. 2 is primarily determined by the DC level associated with components $S_2$ and $S_5$, since the brightness representative DC levels associated with pulse components $S_3$ and $S_4$ are relatively small. As illustrated, the signal waveform of FIG. 2 corresponds to a translated version of output signals from processor 15 as developed at the base input of transistor 50 by the action of inductor 52 and diode 54. The illustrated signal waveform exhibits a peak-to-peak amplitude of approximately +0.5 volts.

Referring now to network 20 of FIG. 1 together with the signal waveform of FIG. 2, diode 54 is biased via potentiometer 55 such that diode 54 remains non-conductive for input signals representative of black level and more positive gray levels. Diode 54 begins to conduct as the input signal level rises in a positive direction toward a threshold level in the vicinity of white level. The conduction of diode 54 is a function of the magnitude of the luminance signal coupled to the anode of diode 54 via inductor 52. Inductor 52 conveys low frequency components of the input signal to diode 54 with less attenuation relative to high frequency components of the input signal, whereby diode 54 conducts more heavily in response to low frequency input signal components compared to high frequency input signal components. In this respect inductor 52 acts as a low pass filter with respect to signals conveyed to diode 54. When conductive, diode 54 serves to load the base input circuit of transistor 50 comprising base bias resistor 57 such that those (lower frequency) signal components which render diode 54 conductive are attenuated at the base of transistor 50.

Diode 54 is biased to produce a signal amplitude compressing effect particularly with respect to higher levels of white-going low frequency input signal components, and exhibits increasing compression as such signal components approach peak white level. Diode 54 conducts in its non-linear region over most of the compression region above its threshold conduction level, during which time diode 54 exhibits an offset voltage of between 0.0 volts and +0.5 volts. Accordingly, the signal compression is non-linear.

The signal compressing effect produced by diode 54 can be seen from "staircase" components $S_2$ of the signal waveform in FIG. 2. The first step of signal component $S_2$, in the vicinity of black level, in uncompressed as the magnitude of this step is insufficient to render diode 54 conductive. The second, more positive step is compressed slightly as diode 54 begins to conduct. The remaining increasingly more positive steps are subjected to increasing compression as the magnitude of these steps render diode 54 increasingly conductive. In this example the uppermost, most positive step of staircase component $S_2$ corresponds to a white level of approximately 80 IRE units.

Peaking of the rising edge transitions of the uppermost three steps of staircase component $S_2$ (as indicated by $P_1$) results because these edge transitions comprise high frequency components which are not subject to the same amount of compression as the associated low frequency steps. Such high frequency components are attenuated by inductor 52 before reaching diode 54, whereby diode 54 is less conductive and produces less compression in response to such high frequency edge components. A similar peaking effect occurs with respect to the rising edge transition of rectangular signal components $S_5$, as indicated by $P_2$. Pulses $S_3$ and $S_4$ are subject to little or no amplitude compression because these components contain primarily high frequency components which are attenuated before reaching diode 54, thereby rendering diode 54 less likely to become conductive to produce amplitude compression.

As mentioned above, signal compression results as a consequence of the base input circuit of transistor 50 being loaded when diode 54 conducts. The input signal loading path, comprising inductor 52, diode 54 and the resistive portion of potentiometer 55 between the wiper and ground, is a very high impedance circuit when diode 54 is non-conductive. The amount of input signal loading and resulting signal compression are a function of the level of conduction of diode 54 and the impedance exhibited by inductor 52. Illustratively, a high level input signal DC component of a given magnitude is likely to result in maximum input signal loading and compression due to the low impedances exhibited by inductor 52 and conductive diode 54. A higher frequency input signal component of such given magnitude, if sufficient to render diode 54 conductive, will result in less loading and signal compression due to the increased impedance of inductor 52 and the relatively lower conduction level of diode 54. High frequency components above 5 MHz are attenuated in the output signal from network 20 due to the equivalent lumped capacitance appearing at the collector of transistor 50 and the input circuit of matrix amplifier 25.

The signal of FIG. 2 was produced in response to an unpeaked output signal from processor 15 having a peak white amplitude level of substantially 100 IRE units, corresponding to a maximum peak white level, for each of signal components $S_2$-$S_5$. In the compressed output signal from network 20 as indicated by the signal waveform of FIG. 2, components $S_2$ and $S_5$ exhibit a compressed peak white amplitude of approximately 80 IRE units, and relatively uncompressed components $S_3$ and $S_4$ as well as peaking component $P_2$ exhibit peak white amplitude levels in the vicinity of 100 IRE units. This result was obtained with respect to reference settings of the adjustable contrast and brightness control potentiometers associated with networks 16 and 18, e.g., at a center range detent position for these controls.

The frequency selective amplitude compression provided by network 20 advantageously restricts the amplitude of the low frequency luminance signal components as white level is approached, thereby reducing the likelihood of image field blooming of a projected image. The information content of relatively small amplitude low-frequency components is unimpaired, and the information content of larger amplitude low-frequency components in the vicinity of white level is largely maintained although compressed in amplitude. The latter result is aided by the non-linear compression employed, wherein the amount of compression increases as the peak white level is approached.

In addition, the fine detail information of large amplitude video signals in the vicinity of white level is enhanced or "highlighted" because high frequency video signal components are not subject to the amount of amplitude compression experienced by low frequency components. This result is evidenced by the amplitude peaking $P_1$ and $P_2$ associated with the high frequency edge transitions of signal components $S_2$ and $S_5$, and is also indicated by the relatively uncompressed amplitudes of pulses $S_3$ and $S_4$ with substantial high frequency content. It has also been observed that additional image detail enhancement can result from a high frequency peaking effect associated with the self resonance of inductor 52, and with the resonance of inductor 52 with effective capacitances associated with the base input of transistor 50.

The DC reference level of the luminance signal, as established by the DC restoring circuits in luminance processor 15, is advantageously maintained in view of the DC coupling rather than AC coupling between the input of network 20 and the cathode ray tubes.

The described frequency selective signal compressing apparatus can also be advantageously used in a conventional "direct view" television receiver system, particularly where the image display tube is driven by driver amplifiers of wide dynamic range capable of driving the display tube into a saturated conductive state.

What is claimed is:

1. In a video signal processing and display system, apparatus comprising:
   a source of image representative video signals comprising low and high frequency components and exhibiting a range of amplitude levels between black and white image levels;
   image display means for reproducing an image in response to video signals provided thereto; and
   signal translating means coupled to said source for providing translated video signals to said display means; wherein
   said translating means comprises compressing means responsive to said video signal for selectively varying the amplification of low frequency white image representative amplitude components of said video signal as a function of the magnitude of said low frequency video signal components, relative to high frequency white image representative amplitude components of said video signal.

2. Apparatus according to claim 1, wherein
   said compressing means compresses said low frequency white image representative amplitude components above a threshold level.

3. In a video signal processing and display system, apparatus comprising
   a source of image representative video signals comprising low and high frequency components and exhibiting a range of amplitude levels between black and white image levels;
   image display means for reproducing an image in response to video signals provided thereto; and
   signal translating means coupled to said source for providing translated video signals to said display means; said translating means comprising compressing means for selectively varying the amplification of low frequency white image representative amplitude components of said video signal above a threshold level as a function of said low frequency video signal components, relative to high frequency white image representative amplitude components of said video signal;
   wherein said signal comprising means comprises:
   threshold conduction means; and
   frequency selective means responsive to video signals from said source and coupled to said threshold means for controlling the conduction of said threshold means in accordance with the amplitude-versus-frequency characteristic of said frequency selective means, wherein
   said threshold means is non-conductive over a first range of low frequency amplitude components between image black level and said threshold level in a white image direction, and is conductive to provide amplitude compression over a second range of low frequency amplitude components above said threshold level in a white image direction for restricting the magnitude of said low frequency components in a white image direction as a white image level extreme is approached.

4. In a video signal processing and display system, apparatus comprising
   a source of image representative video signals comprising low and high frequency components and exhibiting a range of amplitude levels between black and white image levels;
   image display means for reproducing an image in response to video signals provided thereto; and
   signal translating means coupled to said source for providing translated video signals to said display means; said translating means comprising compressing means for selectively varying the amplification of low frequency white image representative amplitude components of said video signal above a threshold level, relative to high frequency white image representative amplitude components of said video signal;
   wherein said signal compressing means is included in a video signal path between said source and said display means, and comprises
   a threshold conduction device coupled to said signal path; and
   a frequency selective network exhibiting a low pass filter characteristic coupled to said signal path and to said threshold device for controlling the conduction of said threshold device such that said threshold device exhibits increasing conduction in response to the presence of low frequency white image representative components of said video signal above said threshold level, for thereby compressing the amplitude of such low frequency components in said signal path.

5. Apparatus according to claim 4, wherein
   said threshold device and said frequency selective network are coupled in series from said signal path to a point of reference potential.

6. Apparatus according to claim 5, wherein said threshold device comprises a semiconductor junction; and said frequency selective network comprises an inductor.

7. Apparatus according to claim 6 and further comprising:

a transistor with a base input electrode for receiving amplitude compressed video signals, an emitter electrode coupled to a reference potential, and a collector output electrode for providing compressed video signals to said display means; and a resistor coupled fro said base electrode to a reference potential.

8. Apparatus according to claim 1, wherein said video signal corresponds to the luminance component of a composite television signal.

9. In a projection-type television receiver for projecting an image derived from an image reproducing device onto a viewing screen, apparatus comprising:

a source of image representative video signals comprising low and high frequency components and exhibiting a range of amplitude levels between black and white image levels; and signal translating means coupled to said source for providing translated video signals to said display device; wherein said signal translating means comprises compressing means responsive to said video signal for selectively varying the amplification of low frequency white image amplitude components of said video signal as a function of the magnitude of said low frequency video signal components, relative to high frequency white image amplitude components of said video signal.

10. Apparatus according to claim 9, wherein said video signal corresponds to the luminance component of a composite television signal.

* * * * *

Disclaimer

4,573,081.—*Jereld R. Reeder,* Indianapolis, Ind. FREQUENCY SELECTIVE VIDEO SIGNAL COMPRESSION. Patent dated Feb. 25, 1986. Disclaimer filed Apr. 7, 1986, by the assignee, RCA Corp.

Hereby enters this disclaimer to claims 1–10 of said patent.

[*Official Gazette June 17, 1986.*]

Disclaimer

4,573,081.—*Jereld R. Reeder,* Indianapolis, Ind. FREQUENCY SELECTIVE VIDEO SIGNAL COMPRESSION. Patent dated Feb. 25, 1986. Disclaimer filed Apr. 7, 1986, by the assignee, *RCA Corp.*

Hereby enters this disclaimer to claims 1–10 of said patent.

[*Official Gazette August 5, 1986.*]